United States Patent
Young

(10) Patent No.: US 12,015,585 B2
(45) Date of Patent: Jun. 18, 2024

(54) SYSTEM AND METHOD FOR DETECTION, TRANSLATION, AND CATEGORIZATION OF VISUAL CONTENT ASSOCIATED WITH MALICIOUS ELECTRONIC COMMUNICATION

(71) Applicant: BANK OF AMERICA CORPORATION, Charlotte, NC (US)

(72) Inventor: Michael Robert Young, Davidson, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 18/140,871

(22) Filed: Apr. 28, 2023

(65) Prior Publication Data
US 2023/0353528 A1 Nov. 2, 2023

Related U.S. Application Data

(60) Provisional application No. 63/336,598, filed on Apr. 29, 2022.

(51) Int. Cl.
*H04L 51/23* (2022.01)
*H04L 51/07* (2022.01)

(52) U.S. Cl.
CPC .............. *H04L 51/23* (2022.05); *H04L 51/07* (2022.05)

(58) Field of Classification Search
CPC ................................. H04L 51/07; H04L 51/23
USPC ........................................................ 709/206
See application file for complete search history.

(56) References Cited

U.S. PATENT DOCUMENTS

| | | |
|---|---|---|
| 9,256,748 B1 | 2/2016 | Gates et al. |
| 9,558,332 B1* | 1/2017 | Keiser ................... H04L 51/063 |
| 9,787,638 B1* | 10/2017 | Adams ................ H04L 63/1408 |
| 10,521,697 B2 | 12/2019 | Agarwal et al. |
| 10,560,464 B2 | 2/2020 | Green |
| 10,637,884 B2 | 4/2020 | Apple et al. |
| 10,834,128 B1* | 11/2020 | Rajagopalan ......... H04L 51/212 |
| 10,942,991 B1* | 3/2021 | Kidd ................... G06F 16/9574 |
| 11,019,094 B2 | 5/2021 | Starink et al. |
| 11,153,341 B1 | 10/2021 | Ismael et al. |
| 11,200,315 B2 | 12/2021 | Cho |
| 11,526,726 B2 | 12/2022 | Chen |
| 11,606,319 B2 | 3/2023 | Lakshmipathy |
| 11,704,898 B2 | 7/2023 | Jelveh |
| 11,720,742 B2 | 8/2023 | Nagaraja et al. |

(Continued)

*Primary Examiner* — Ruolei Zong
(74) *Attorney, Agent, or Firm* — Moore & Van Allen PLLC; Nicholas C. Russell

(57) ABSTRACT

Embodiments of the present invention provide a system for detecting, translating, and categorizing visual content associated with malicious electronic communication. The system is configured for establishing a communication link with one or more third party systems, continuously monitoring one or more electronic communications associated with the one or more third party systems, detecting at least one electronic communication from the one or more electronic communications that meets one or more triggers, analyzing the at least one electronic communication to translate the at least one electronic communication to text, and categorizing the at least one electronic communication based on the text associated with the at least one electronic communication.

17 Claims, 5 Drawing Sheets

(56) References Cited

U.S. PATENT DOCUMENTS

| | | | |
|---|---|---|---|
| 2007/0143432 A1* | 6/2007 | Klos | H04L 51/212 |
| | | | 709/206 |
| 2009/0177979 A1* | 7/2009 | Garbow | G06F 3/00 |
| | | | 715/757 |
| 2010/0082798 A1* | 4/2010 | Bhogal | G06Q 10/10 |
| | | | 709/224 |
| 2012/0278886 A1* | 11/2012 | Luna | H04L 63/1408 |
| | | | 726/22 |
| 2013/0031600 A1* | 1/2013 | Luna | G06F 12/1408 |
| | | | 726/1 |
| 2017/0061248 A1* | 3/2017 | Ryan, Jr. | H04W 12/02 |
| 2017/0134516 A1* | 5/2017 | Gutman | H04L 67/55 |
| 2017/0214701 A1 | 7/2017 | Hasan | |
| 2019/0102374 A1* | 4/2019 | Tiwari | G06F 40/284 |
| 2020/0067953 A1* | 2/2020 | Mathew | H04L 63/0227 |
| 2020/0387995 A1* | 12/2020 | Bucciarelli | H04W 4/14 |
| 2021/0211462 A1* | 7/2021 | Birch | H04L 63/0236 |
| 2021/0275928 A1* | 9/2021 | Ashoori | A63F 13/79 |
| 2021/0357498 A1* | 11/2021 | McEachern | G06F 21/552 |
| 2022/0109646 A1* | 4/2022 | Lakshmipathy | G06F 40/169 |
| 2022/0230020 A1 | 7/2022 | Saeugling | |
| 2023/0106873 A1 | 4/2023 | Qin et al. | |
| 2023/0231897 A1 | 7/2023 | Kolowich et al. | |

* cited by examiner

SYSTEM AND METHOD FOR DETECTION, TRANSLATION, AND CATEGORIZATION OF VISUAL CONTENT ASSOCIATED WITH MALICIOUS ELECTRONIC COMMUNICATION

CROSS-REFERENCE TO RELATED APPLICATIONS

This application is a U.S. Non-provisional application claiming priority to U.S. Provisional Patent Application No. 63/336,598, filed Apr. 29, 2022 titled "System and Method for Detection, Translation, and Categorization of Visual Content Associated with Malicious Electronic Communication", the contents of which are hereby incorporated by reference in its entirety.

BACKGROUND

Conventional systems do not have the capability to identify malicious electronic communication activity. As such, there exists a need for a system that can effectively detect, translate, and categorize visual content associated with malicious electronic communication.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for detecting, translating, and categorizing visual content associated with malicious electronic communication. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention establishes a communication link with one or more third party systems, continuously monitors one or more electronic communications associated with the one or more third party systems, detects at least one electronic communication from the one or more electronic communications that meets one or more triggers, analyzes the at least one electronic communication to translate the at least one electronic communication to text, and categorizes the at least one electronic communication based on the text associated with the at least one electronic communication.

In some embodiments, the present invention performs one or more remediation actions based on categorizing the at least one electronic communication.

In some embodiments, the one or more remediation actions comprise at least one of automatically deleting the at least one electronic communication, notifying the one or more third party systems, notifying one or more users associated with an entity, wherein the one or more users are users who viewed the at least one electronic communication or will review the at least one electronic communication in the future, and notifying one or more other entities.

In some embodiments, the present invention categorizes the at least one electronic communication based on analyzing the text.

In some embodiments, the one or more triggers comprise identification of at least one of an entity name, entity logo, and one or more predefined phrases.

In some embodiments, the one or more third party systems comprise at least one of social media systems, non-indexed internet system, open web system, and user device messaging system.

In some embodiments, the at least one electronic communication is visual content.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
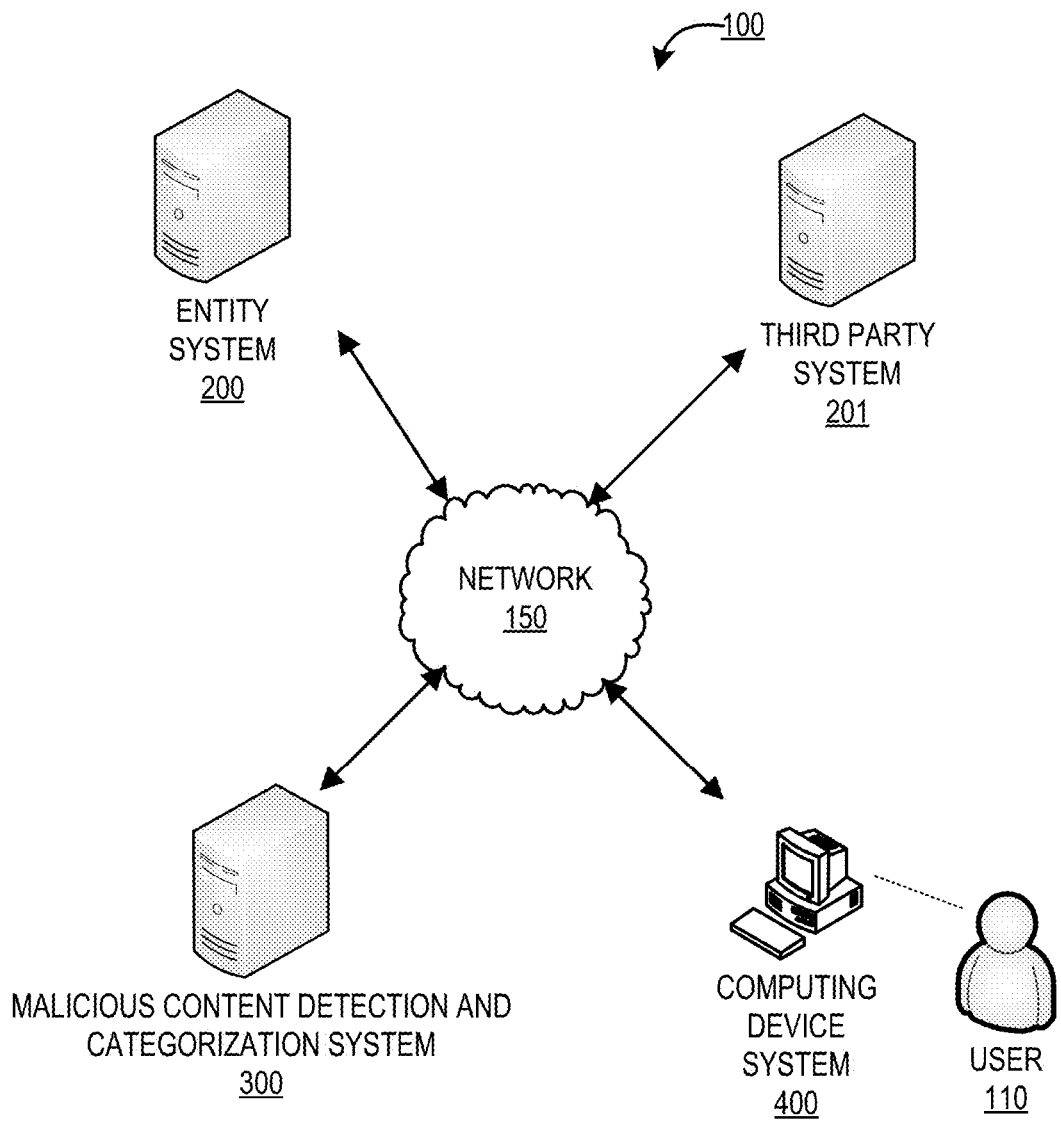
Figure 2:
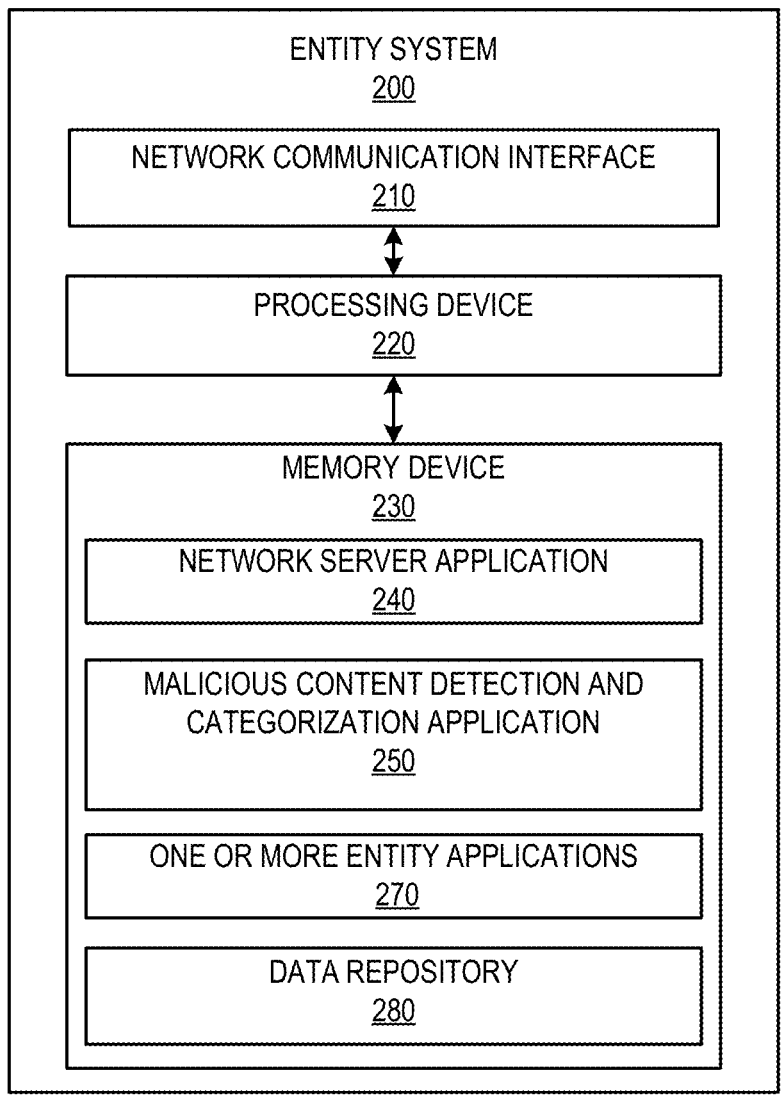
Figure 3:
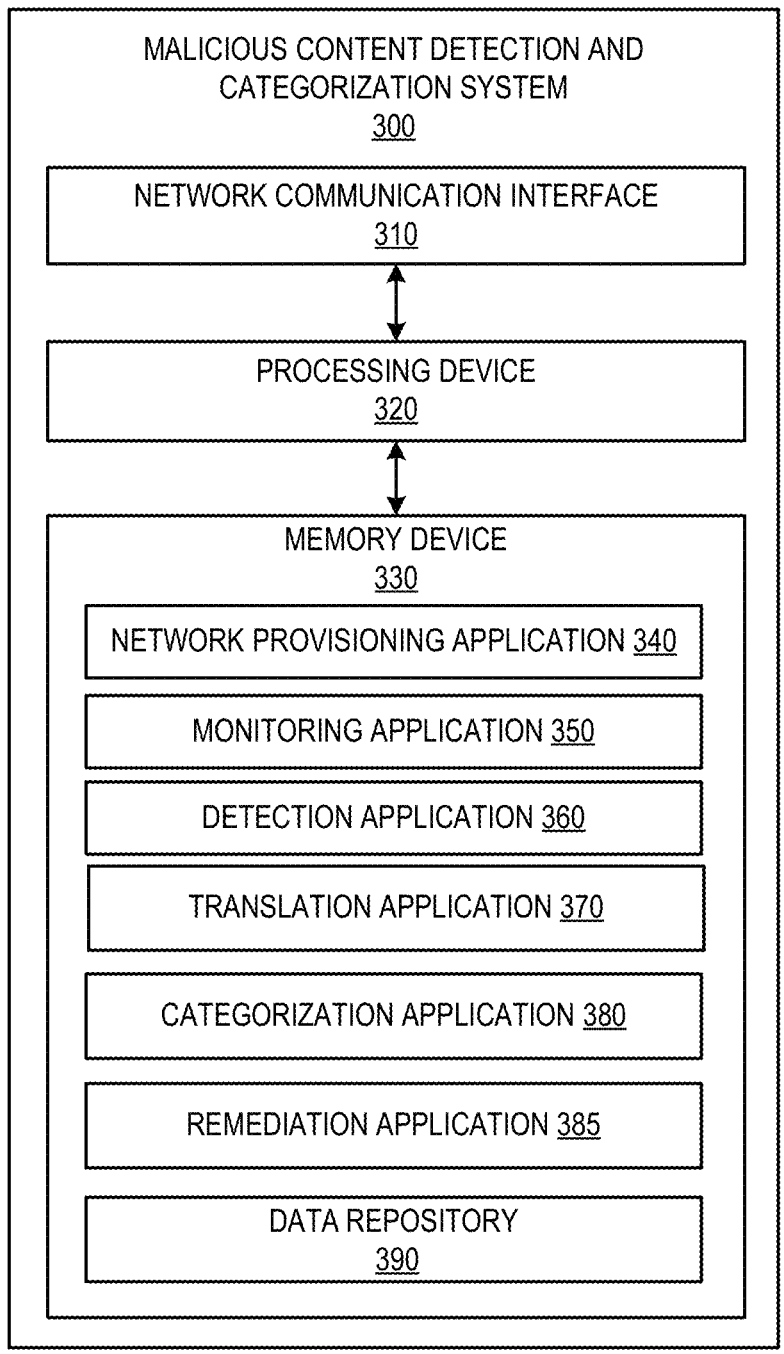
Figure 4:
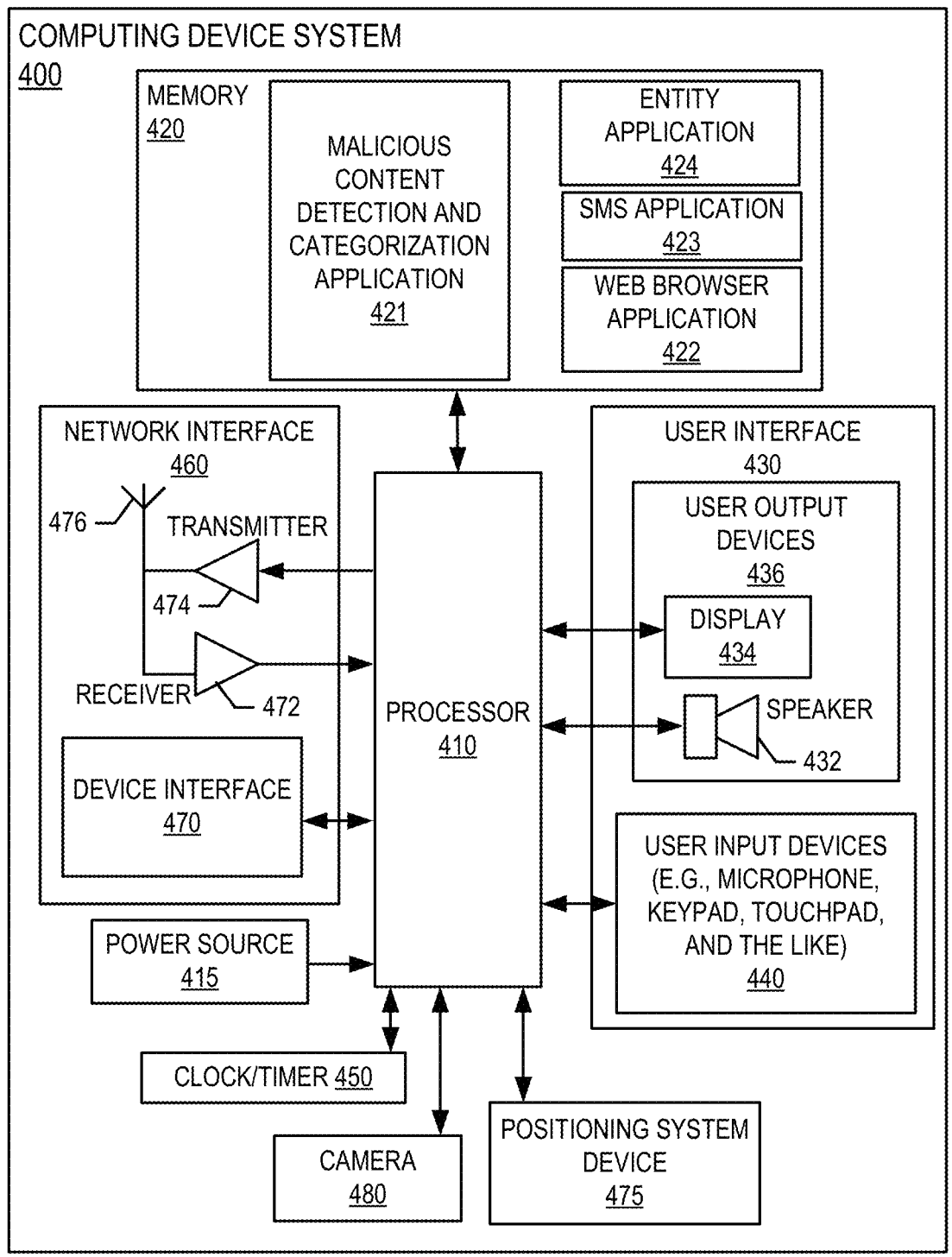
Figure 5:
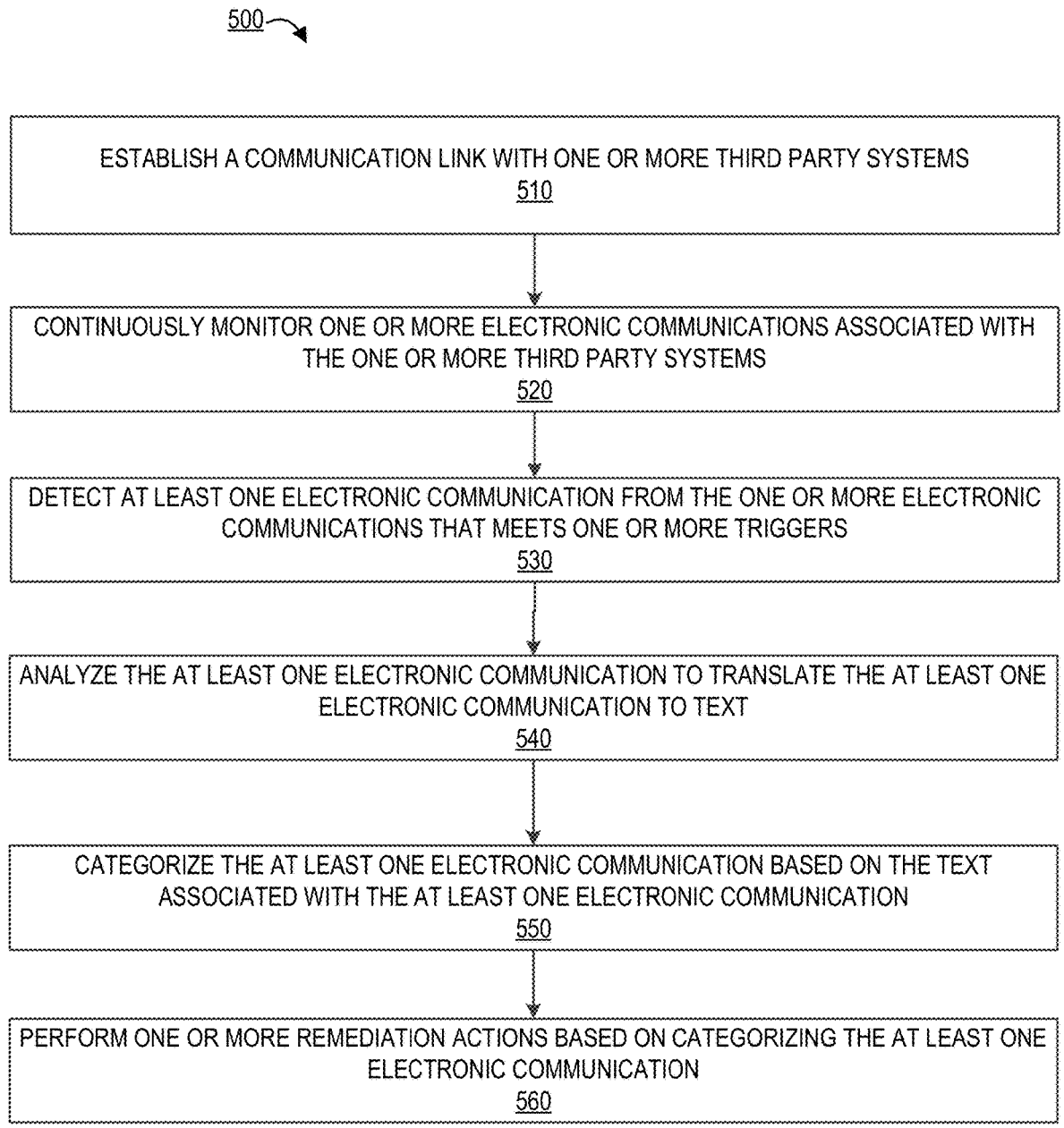

Having thus described embodiments of the invention in general terms, reference will now be made the accompanying drawings, wherein:

FIG. 1 provides a block diagram illustrating a system environment for detecting, translating, and categorizing visual content associated with malicious electronic communication, in accordance with an embodiment of the invention;

FIG. 2 provides a block diagram illustrating the entity system 200 of FIG. 1, in accordance with an embodiment of the invention;

FIG. 3 provides a block diagram illustrating a malicious content detection and categorization system 300 of FIG. 1, in accordance with an embodiment of the invention;

FIG. 4 provides a block diagram illustrating the computing device system 400 of FIG. 1, in accordance with an embodiment of the invention; and FIG. 5 provides a flowchart illustrating a process flow for detecting, translating, and categorizing visual content associated with malicious electronic communication, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In one embodiment, the term "entity" or "resource entity" may be any financial institution. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, one or more electronic communications over third party systems are not completely monitored, thereby causing an increase in the number of malicious electronic communications that are initiated and communicated via the third party systems by malicious actors. As such, there exists a need for a mechanism in place that effectively and efficiently monitors the one or more electronic communications.

FIG. 1 provides a block diagram illustrating a system environment 100 for detecting, translating, and categorizing visual content associated with malicious electronic communication, in accordance with an embodiment of the invention. As illustrated in FIG. 1, the environment 100 includes a malicious content detection and categorization system 300, an entity system 200, third party systems 201, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 are not customers of the entity. In some embodiments, the one or more users 110 are potential customers of the entity. In some embodiments, the one or more users 110 are customers of other entities (e.g., other financial institutions). In some embodiments, the one or more users 110 are customers of one or more third party systems (e.g., social media platforms, non-indexed internet, or the like).

The entity system(s) 200 may be any system owned or otherwise controlled by an entity to support or perform one or more process steps described herein. In some embodiments, the entity is a financial institution. In some embodiments, the entity may be a non-financial institution. The one or more third party systems 201 may be any systems that allow users to perform electronic communication activity. In some embodiments, the third party systems 201 may be social media platforms, non-indexed internet platform, open web platform, user device messaging platform (e.g., smartphone messaging), or the like.

The malicious content detection and categorization system 300 is a system of the present invention for performing one or more process steps described herein. In some embodiments, the malicious content detection and categorization system 300 may be an independent system. In some embodiments, the malicious content detection and categorization system 300 may be a part of the entity system 200.

The malicious content detection and categorization system 300, the entity system 200, the third party systems 201, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the malicious content detection and categorization system 300 is configured to communicate information or instructions with the entity system 200, the third party systems 201, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the malicious content detection and categorization system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/ repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a malicious content detection and categorization application 250, one or more entity applications 270, and a data repository 280 comprising data received, extracted, process, and/or the like by the entity system 200. The one or more entity applications 270 may be any applications developed, supported, maintained, utilized, and/or controlled by the entity. The computer-executable program code of the network server application 240, the malicious content detection and categorization application 250, the one or more entity application 270 to perform certain logic, data-extraction, and data-storing functions of the entity system 200 described herein, as well as communication functions of the entity system 200.

The network server application 240, the malicious content detection and categorization application 250, and the one or more entity applications 270 are configured to store data in the data repository 280 or to use the data stored in the data repository 280 when communicating through the network communication interface 210 with the malicious content detection and categorization system 300, and/or the computing device system 400 to perform one or more process steps described herein. In some embodiments, the entity system 200 may receive instructions from the malicious content detection and categorization system 300 via the malicious content detection and categorization application 250 to perform certain operations. The malicious content detection and categorization application 250 may be provided by the malicious content detection and categorization system 300. The one or more entity applications 270 may be any of the applications used, created, modified, facilitated, and/or managed by the entity system 200.

FIG. 3 provides a block diagram illustrating the malicious content detection and categorization system 300 in greater detail, in accordance with embodiments of the invention. As illustrated in FIG. 3, in one embodiment of the invention, the malicious content detection and categorization system 300 includes one or more processing devices 320 operatively coupled to a network communication interface 310 and a memory device 330. In certain embodiments, the malicious content detection and categorization system 300 is operated by an entity, such as a financial institution. In some embodiments, the malicious content detection and categorization system 300 is owned or operated by the entity of the entity system 200. In some embodiments, the malicious content detection and categorization system 300 may be an independent system. In alternate embodiments, the malicious content detection and categorization system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the malicious content detection and categorization system 300 described herein. For example, in one embodiment of the malicious content detection and categorization system 300, the memory device 330 includes, but is not limited to, a network provisioning application 340, a monitoring application 350, a detection application 360, a translation application 370, a categorization application 380, a remediation application 385, and a data repository 390 comprising any data processed or accessed by one or more applications in the memory device 330. The computer-executable program code of the network provisioning application 340, the monitoring application 350, the detection application 360, the translation application 370, the categorization application 380, and the remediation application 385 may instruct the processing device 320 to perform certain logic, data-processing, and data-storing functions of the malicious content detection and categorization system 300 described herein, as well as communication functions of the malicious content detection and categorization system 300.

The network provisioning application 340, the monitoring application 350, the detection application 360, the translation application 370, the categorization application 380, and the remediation application 385 are configured to invoke or use the data in the data repository 390 when communicating through the network communication interface 310 with the entity system 200, and/or the computing device system 400. In some embodiments, the network provisioning application 340, the monitoring application 350, the detection application 360, the translation application 370, the categorization application 380, and the remediation application 385 may store the data extracted or received from the entity system 200, and the computing device system 400 in the data repository 390. In some embodiments, the network provisioning application 340, the monitoring application 350, the detection application 360, the translation application 370, the categorization application 380, and the remediation application 385 may be a part of a single application. The functionalities of the network provisioning application 340, the monitoring application 350, the detection application 360, the translation application 370, the categorization application 380, and the remediation application 385 are explained in greater detail in FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a malicious content detection and categorization application 421, entity application 424. These applications also typically instructions to a graphical user interface (GUI) on the display 430 that allows the user 110 to interact with the entity system 200, the malicious content detection and categorization system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the malicious content detection and categorization application 421 provided by the malicious content detection and categorization system 300 allows the user 110 to access the malicious content detection and categorization system 300. In some embodiments, the entity application 424 provided by the entity system 200 and the malicious content detection and categorization application 421 allow the user 110 to access the functionalities provided by the malicious content detection and categorization system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for detecting, translating, and categorizing visual content associated with malicious electronic communication, in accordance with an embodiment of the invention.

As shown in block 510, the system establishes a communication link with one or more third party systems. The one or more third party systems may be any systems that allow one or more users to communicate with each other, where the one or more users may be customers/potential customers of an entity associated with the system, customers of other entities (e.g., other financial institutions), customers of the one or more third party systems, or the like. Examples of such systems comprise at least one of social media systems, non-indexed internet system, open web system, user device messaging system, and/or the like. In some embodiments, the communication link may be a direct communication link with the one or more third party systems, which allows the system to gain access to information associated with the one or more third party systems based on permissions received from the one or more third party systems.

As shown in block 520, the system continuously monitors one or more electronic communications associated with the one or more third party systems. The system continuously scans and monitors the one or more electronic communications that are initiated by the one or more users on the one or more third party systems, via the communication link. The one or more electronic communications may comprise text communications, visual communications, audio communications, or the like. In some preferred embodiments of the present invention, the one or more electronic communications may be visual communications comprising visual content/media (e.g., images, videos, infographics, Graphics Interchange Format (GIF), or the like)

As shown in block 530, the system detects at least one electronic communication from the one or more electronic communications that meets one or more triggers. In some embodiments, the one or more triggers may comprise identification of at least one of an entity name, entity logo, one or more predefined phrases, one or more images, and/or the like. The system may continuously scan and monitor the one or more electronic communications to continuously check if any of the triggers have been met. For example, the system may continuously scan the one or more electronic communications to check if the one or more electronic communications comprise a financial institution logo, a financial institution name, phrases such as, but not limited to, quick cash, instant cash, or the like, and images of cash, bills, coins, or the like. In some embodiments, the system may use Optical Character Recognition (OCR) technology and Natural Language Processing (NLP) for scanning the one or more electronic communications to identify the one or more triggers. In some embodiments, the scanning may be a scanning scan that is specifically run to identify the one or more triggers.

As shown in block 540, the system analyzes the at least one electronic communication to translate the at least one electronic communication to text. Upon identification of the at least one electronic communication, the system translates the at least one electronic communication to text format. For example, the system may convert the entire content of the at least one electronic communication to text format.

As shown in block 550, the system categorizes the at least one electronic communication based on the text associated with the at least one electronic communication. The system analyzes the text based on one or more trained machine learning models to categorize the at least one electronic communication. In some embodiments, the system may classify the at least one electronic communication as low exposure, medium exposure, and high exposure based on the text associated with the at least one electronic communication. In some embodiments, the system may use Optical Character Recognition (OCR) technology and Natural Language Processing (NLP) to perform step described in block 550 and/or block 560.

As shown in block 560, the system performs one or more remediation actions based on categorizing the at least one electronic communication. The one or more remediation actions may comprise automatically deleting the at least one electronic communication (e.g., based on communicating with the one or more third party systems), notifying the one or more third party systems, notifying one or more users associated with the entity, wherein the one or more users are users who viewed the at least one electronic communication or will likely review the at least one electronic communication in the future (e.g., based on historical activity associated with the users), and notifying the one or more other entities. In some embodiments, the one or more remediation actions may further comprise notifying the one or more users based on proximity of the location of the users to the location of the initiation of the at least one electronic communication, where location based data may be accessed from the one or more third party systems and/or one or more user computing devices associated with the one or more users. In some embodiments, the system may implements one or more of the remediation actions based on the categorization of the at least one electronic communication.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for detecting, translating, and categorizing visual content associated with malicious electronic communication, the system comprising:
   at least one network communication interface;
   at least one non-transitory storage device; and
   at least one processing device coupled to the at least one non-transitory storage device and the at least one network communication interface, wherein the at least one processing device is configured to:
      establish a communication link with one or more third party systems;
      continuously monitor one or more electronic communications associated with the one or more third party systems;
      detect at least one electronic communication from the one or more electronic communications that meets one or more triggers, wherein the one or more triggers comprise identification of at least one of an entity name, entity logo, currency logo, currency images, and one or more predefined phrases;
      analyze the at least one electronic communication to translate the at least one electronic communication to text, via optical character recognition and natural language processing; and
      categorize the at least one electronic communication based on the text associated with the at least one electronic communication, wherein categorizing the at least one electronic communication comprises assigning one or more exposure tags to the at least one electronic communication, wherein the one or more exposure tags comprise low exposure tag, medium exposure tag, and high exposure tag.

2. The system of claim 1, wherein the at least one processing device is configured to:
   perform one or more remediation actions based on assigning the at least one electronic communication the low exposure tag, the medium exposure tag, or the high exposure tag.

3. The system of claim 2, wherein the one or more remediation actions comprise at least one of:
   automatically deleting the at least one electronic communication;
   notifying the one or more third party systems;
   notifying one or more users associated with an entity, wherein the one or more users are users who viewed the at least one electronic communication or will review the at least one electronic communication in the future; and
   notifying one or more other entities.

4. The system of claim 1, wherein the at least one processing device is configured to categorize the at least one electronic communication based on analyzing the text.

5. The system of claim 1, wherein the one or more third party systems comprise at least one of social media systems, non-indexed internet system, open web system, and user device messaging system.

6. The system of claim 1, wherein the at least one electronic communication is visual content.

7. A computer program product for detecting, translating, and categorizing visual content associated with malicious electronic communication, the computer program product comprising a non-transitory computer-readable storage medium having computer executable instructions for causing a computer processor to perform the steps of:

establishing a communication link with one or more third party systems;

continuously monitoring one or more electronic communications associated with the one or more third party systems;

detecting at least one electronic communication from the one or more electronic communications that meets one or more triggers, wherein the one or more triggers comprise identification of at least one of an entity name, entity logo, currency logo, currency images, and one or more predefined phrases;

analyzing the at least one electronic communication to translate the at least one electronic communication to text, via optical character recognition and natural language processing; and categorizing the at least one electronic communication based on the text associated with the at least one electronic communication, wherein categorizing the at least one electronic communication comprises assigning one or more exposure tags to the at least one electronic communication, wherein the one or more exposure tags comprise low exposure tag, medium exposure tag, and high exposure tag.

8. The computer program product of claim 7, wherein the computer executable instructions cause the computer processor to perform the steps of performing one or more remediation actions based on assigning the at least one electronic communication the low exposure tag, the medium exposure tag, or the high exposure tag.

9. The computer program product of claim 8, wherein the one or more remediation actions comprise at least one of:

automatically deleting the at least one electronic communication;

notifying the one or more third party systems;

notifying one or more users associated with an entity, wherein the one or more users are users who viewed the at least one electronic communication or will review the at least one electronic communication in the future; and notifying one or more other entities.

10. The computer program product of claim 7, wherein the computer executable instructions cause the computer processor to perform the step of categorizing the at least one electronic communication based on analyzing the text.

11. The computer program product of claim 7, wherein the one or more third party systems comprise at least one of social media systems, non-indexed internet system, open web system, and user device messaging system.

12. The computer program product of claim 7, wherein the at least one electronic communication is visual content.

13. A computer implemented method for detecting, translating, and categorizing visual content associated with malicious electronic communication, wherein the method comprises:

establishing a communication link with one or more third party systems;

continuously monitoring one or more electronic communications associated with the one or more third party systems;

detecting at least one electronic communication from the one or more electronic communications that meets one or more triggers, wherein the one or more triggers comprise identification of at least one of an entity name, entity logo, currency logo, currency images, and one or more predefined phrases;

analyzing the at least one electronic communication to translate the at least one electronic communication to text, via optical character recognition and natural language processing; and categorizing the at least one electronic communication based on the text associated with the at least one electronic communication, wherein categorizing the at least one electronic communication comprises assigning one or more exposure tags to the at least one electronic communication, wherein the one or more exposure tags comprise low exposure tag, medium exposure tag, and high exposure tag.

14. The computer implemented method of claim 13, wherein the method further comprises performing one or more remediation actions based on assigning the at least one electronic communication the low exposure tag, the medium exposure tag, or the high exposure tag.

15. The computer implemented method of claim 14, wherein the one or more remediation actions comprise at least one of:

automatically deleting the at least one electronic communication;

notifying the one or more third party systems;

notifying one or more users associated with an entity, wherein the one or more users are users who viewed the at least one electronic communication or will review the at least one electronic communication in the future; and notifying one or more other entities.

16. The computer implemented method of claim 13, wherein categorizing the at least one electronic communication is based on analyzing the text.

17. The computer implemented method of claim 13, wherein the one or more third party systems comprise at least one of social media systems, non-indexed internet system, open web system, and user device messaging system.

\* \* \* \* \*